May 4, 1954  G. C. BERGER ET AL  2,677,550
STRAW AND STALK DISINTEGRATING AND SCATTERING EQUIPMENT
Filed Jan. 5, 1950
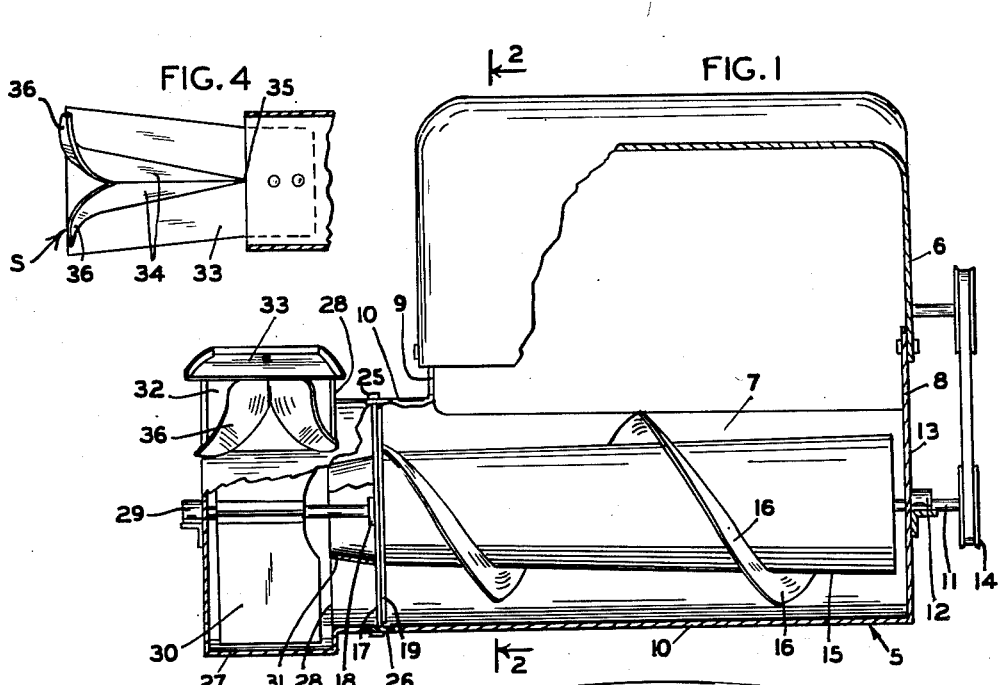
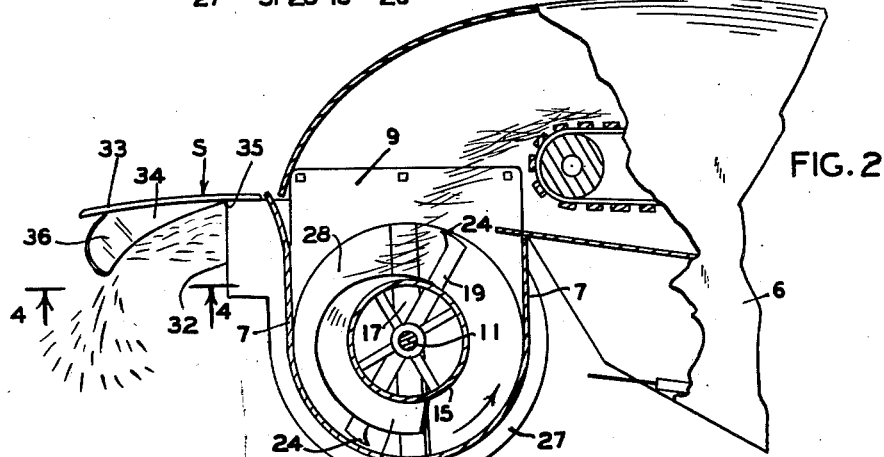
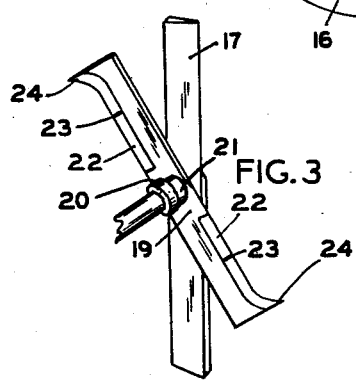
INVENTOR
GEORGE C. BERGER
ALBIN O. MYROLD
BY
*Williamson + Williamson*
ATTORNEYS Patented May 4, 1954

2,677,550

UNITED STATES PATENT OFFICE 2,677,550

STRAW AND STALK DISINTEGRATING AND SCATTERING EQUIPMENT

George C. Berger, Erskine, and Albin O. Myrold, Crookston, Minn.

Application January 5, 1950, Serial No. 136,936

4 Claims. (Cl. 275—3)

This invention relates to combines and other harvesting machines which usually remove and separate the grain kernels, fruit, or natural food products from the stalks and straw and which normally discharge the stalks from the delivery end of the machine. It has particular relation to the disintegration and wide scattering of the disintegrated particles of stalks and straw continuously throughout the operation of the machine.

This invention is an improvement of our invention disclosed in our co-pending application filed August 29, 1949, Serial #112,926, and entitled "Improved Straw and Stalk Disintegrating and Scattering Attachment." Our straw and stalk disintegrating and scattering attachment disclosed in this prior application has proved highly successful in the disintegration and scattering of most stalk crops. We have discovered, however, that when harvesting crops having a considerable number of branches of a tortuous nature such as alfalfa, soybeans, and other leguminous type plants, it is possible to simplify our mechanisms and thereby reduce manufacturing costs and at the same time increase the efficiency of the machine.

It is an object of our invention to provide an improved stalk and straw disintegrating and scattering device adapted for use as an attachment or as standard equipment in various harvesting machines such as grain combines, wherein provision is inherently made for direction and discharge of stalks and/or straw after preliminary handling of crops grown by broadcast or row planting.

Another object is to provide a simplified and highly efficient improved stalk and straw disintegrating and scattering device which will positively preclude entangling and matting of the discharge material of a combine or other harvester engaged in harvesting alfalfa, soybeans, and other types of crops having stalks and branches which ordinarily tend to mat and entangle the mechanism of the disintegrating and scattering device.

Another object is the provision of a straw and stalk disintegrating and scattering machine or attachment adapted to be readily applied to the straw or stalk discharge of combines or the like and adapted in co-operation with the straw directing facilities of the combine to cause the straw and stalks to be very finely disintegrated and to thereafter be positively drawn by a rapidly revolving rotor from the area of the disintegrating operation into the path of the rotating members of the rotor itself whereby it is agitated and centrifugally flung and disbursed over substantial area to the side and rear of the combine or other harvester.

Another object of our invention is to simplify our prior structure and reduce the numbers of certain vital parts thereof and thereby provide a more efficient stalk and straw disintegrator and scatterer and reduce the manufacturing cost thereof.

More specifically, it is an object to provide a structure more simple than that required by the invention disclosed in our previous application referred to above so as to require only a single rotary cutter element and a single co-operating cutting element, fixed or otherwise, which work in close co-operation with a screw type conveyor to produce a very efficient grinding and disintegration of the straw and stalks into small particles and to further co-operate with additional mechanism for very efficiently and widely disbursing and scattering the disintegrated straw and stalks.

A further object is to provide a device and mechanism of the class described which includes in close co-operation with two cutter elements, one fixed and one rotary, a rapidly rotating screw-type conveyor with its flanges sufficiently spaced to provide direct contact between its drum portion and the stalks and straw received from the discharge of the combine whereby rapid lateral conveyance of the stalks and straw is insured when the drum is rapidly rotated.

Another object of our invention is to provide a knife for a device and mechanism of the class described which has its cutting edge formed to provide improved scissor-like cutting action between it and its co-operating cutter elements, and has its end portion formed to provide scythe-like cutting action against the stalks and straw received therein while rotating, and to preclude the stalks and straw from slipping outwardly beyond the end of the knife.

Another object is to provide for a device and mechanism of the class described a scattering device which will divide and direct the flow of the discharged stalks and straw in such a manner as to provide a uniform scattering of the same over the ground to the rear and sides of the machine.

These and other objects and advantages of our invention will more fully appear from the following description made in connection with the accompanying drawings, wherein like reference characters refer to similar parts throughout the several views and, in which:

Fig. 1 is a rear elevational view with a section cut away to show the crucial operating elements;

Fig. 2 is a cross-sectional view along line 2—2 of Fig. 1 showing the screw-conveyor and rear end of the combine and in the background the cutting elements and rotor in operation;

Fig. 3 is a perspective view of the rotary cutting knife and its co-operating cutter mounted on a rotatable shaft as seen from behind the screw-conveyor looking toward the rotor; and Fig. 4 is a fragmentary bottom elevational view along line 4—4 of Fig. 2 showing the scattering mechanism and a portion of the rotor housing adjacent its discharge.

Referring now to Figs. 1-4 which show one embodiment of our stalk and straw disintegrating mechanism, Fig. 1 is a view of our invention attached to the rear end and straw discharge portion of a conventional type of combine as seen from the rear. It is a unit which is well adapted as an attachment to various types of conventional combines and other harvesting machines and which is equally applicable as standard construction in the manufacture of harvesters. As shown, our machine or unit is supported within an essentially cylindrical housing 5 which is mounted on the lower rear portion of the combine housing 6, and disposed transversely to the discharge flow of the same. A portion of said cylindrical housing 5 corresponding in length to the width of the discharge end of the combine has approximately one-half of its upper section cut away and its sides 7 built up vertically so as to form what is essentially a trough to receive the straw and stalks directed into it by the inherent structure of the combine. One end of the housing 5 is extended upwardly in a flange 8 for the purpose of providing a means of securing that end of the housing to one side of the combine housing 6, as shown in Fig. 1. At the other end of the trough a portion of the top of the housing 5 is curved upwardly to form a vertical flange 9 which provides a means of securing the other end of the housing 5 to the other side of the combine housing 6. The remaining portion 10 of the housing is substantially cylindrical.

Extending horizontally and transversely relative to the discharge stream of the combine and through the center of the cylindrical housing 5 is a cylindrical shaft 11 mounted for rotation at one of its ends in a bearing 12 which is secured to the outside of the closed end 13 of the cylindrical housing 5. The other end of the shaft 11 is also mounted for rotation, as will hereinafter be described. Mounted on the shaft 11 outside the closed end 13 of the cylindrical housing 5 is a mechanism 14 for receiving a source of power for rotating said shaft at a relatively high rate of speed. As shown in Fig. 1, this source of power may be received from the combine itself. Mounted on the shaft 11 within the cylindrical housing 5 and extending across substantially the full width of the discharge opening of the combine and the receiving opening of the unit is a frusto-conical rotatable drum 15, having a diameter approximately one-half that of the cylindrical housing 5. This drum 15 has a flange 16 secured thereto and extending outwardly therefrom in a spiral pattern, as shown. This spiral flange 16 has a pitch sufficient so that one-half of the drum 15 is surrounded by the flange 16 per convolution of said flange, so as to permit the stalks and straw received from the discharge of the combine to come in direct contact with the drum 15 and be engaged by the flange 16 as it rotates with the drum. The drum 15 and the flange 16 co-operate to form a screw-conveyor for conveying the stalks and straw laterally.

Mounted on the shaft 11 within the closed portion 10 of the cylindrical housing 5 is a fixed cutter element 17. The shaft 11 is permitted to rotate through this fixed cutter element 17 and is prevented from wobbling by a bearing 18 which is welded to the fixed cutter element 17. Mounted on the shaft 11 between the fixed cutter element 17 and the end of the drum 15 in close-working clearance is a rotatable knife 19 which is diametrically disposed relative to the drum 15. These two cutting elements 17 and 19 work in close co-operation and in close proximity to the end of the drum 15. The rotatable knife 19 is frictionally held in place on the shaft 11 in close proximity to the fixed cutter element 17 by means of a tapered nut 20 screwed onto a split sleeve 21 which is welded to the rotary knife 19 and is provided with a tapered thread. The rotary knife 19 is also keyed to the shaft by some suitable means (not shown). The cutting edges 22 of the rotary knife 19 are beveled, as shown in Fig. 3 and have a slot 23 formed in their medial portion. Each end of the knife 19 has a widened and sharpened hook-shaped portion 24 extending forwardly in the direction of rotation of the knife. The fixed knife 17 is secured to the end portion 10 of the housing 5 by means of four screw bolts 25 which extend from the exterior through the housing 5 and are screwed into the ends of the fixed knife 17. To insure that the fixed knife 17 is properly oriented relative to the shaft 11, two small plates 26 are cut out of the end portion 10 of the housing 5 and the fixed knife 17 is mounted on the shaft 11. Then the necessary holes are formed in the plates 26 and they are mounted by means of the screw bolts 25 on the ends of the cutting element 17. Thereafter the plates are welded to the housing 5 in substantially their original positions.

Secured to the end of the housing 5 adjacent its end portion 10 and outwardly of the cutter elements is a rotor housing 27 which has one of its ends 28 open and communicating with the housing 5. The shaft 11 extends through the rotor housing 27 and is mounted for rotation in a bearing 29 which is located exteriorly of the housing, as shown. A rotor 30 is mounted on the shaft 11 for rotation within the housing 27. A relatively short frusto-conical drum 31 is welded to the fixed cutting element 17 and extends to the edge of the open end 28 of the rotor housing 27. The rotor housing 27 has a discharge opening 32 in its upper rearward portion. Attached to the upper portion of the rotor housing adjacent the discharge opening 32 is a scattering device S. This scattering mechanism S consists of a relatively flat and slightly downwardly curved plate 33 and two similar and obtusely triangularly shaped flanges 34 secured thereto and to each other. These flanges 34 are so disposed that their corners containing the smallest angle meet at the forward portion of the plate 33 at a point 35. From the point 35 they extend rearwardly and downwardly, forming a V-shaped divider. The rearmost corner 36 of each of the flanges 34 are curved outwardly and downwardly, as shown in Figs. 2 and 4.

*Operation*

In operation the unit is fastened to the discharge end of the combine or to the harvester housing 6 in position to receive the discharge stream into the open portion of the cylinder housing 5. Most combines and other harvesters have a fairly standard width at their discharge opening so our unit can be used to advantage with practically any harvester. The straw and stalks as they are discharged from the combine or other harvester are directed rearwardly and downwardly of the combine housing because of its inherent structure. The straw is received in the opening of the housing 5 at varying rates and in varying sizes, sometimes reaching it in large clumps. Because of the downward and rearward direction of the straw it is flung upon the rotating drum 15 in direct contact therewith, and is engaged by the spiral flange 16 whereby it is conveyed laterally to the rotary knife 19 and its co-operating cutting element. As shown in Fig. 1, the drum 15, the rotary knife 19, and the rotor 30 are all driven by the shaft 11 at a high rate of speed (for example between 800 and 1600 R. P. M.) as the result of the application of a rotary source of power upon the mechanism 14 which is provided for that purpose. By reducing the number of convolutions of the flange 16 on the drum 15 we have discovered that it is possible to eliminate all but a single rotary cutter knife 19 and a single fixed cutter element 17, thereby simplifying our structure and reducing the cost of manufacture thereof. It should be noted that material striking the drum 15 is carried thereby into the knives 17 and 19 within the period of time required for only two complete turns of the shaft 11. The wide spacing of the flanges 16 insures that the straw and stalks will come in direct contact with the drum 15 and that the flanges 16 will thereby be permitted to engage said straw and stalks to carry them laterally into the cutting elements. For certain types of crops such as alfalfa, soybeans, and other leguminous plants, the bushy and tortuous type of foliage thereon would prevent flanges which were more closely spaced from engaging the straw and stalks of said plants as they were discharged from the combine. Instead, the straw and stalks of said plants would rest upon the outer edges of the flanges and would not come in direct contact with the drum 15. Also, the discharge material of a combine engaged in harvesting such crops has a strong tendency to mat and engangle itself about the drum and flanges and other parts of the mechanism when the flanges are close together. By increasing the pitch of the flanges 16, as shown in Fig. 1, this difficulty has been overcome, and at the same time the efficiency of the machine has been increased and the amount of power required to drive the same has been diminished. Our improved and simplified device handles such discharge materials with ease and without permitting matting or entangling of the same about the various points of the mechanism.

As the straw and stalks are fed laterally by the drum 15 and its flange 16 into the closely co-operating cutting elements 17 and 19, the rapidly rotating knife 19 engages them first. The slot 23 engages some of the stalks and straw and prevents their slipping toward the outer end of the knife, carrying the same with it until it is in position to co-operate with the fixed cutter element 17. In the case of alfalfa, soybeans, etc., the stalks and straw engaged in this manner will prevent additional stalks from sliding outwardly because of their tangled nature. When the slot 23 reaches the cutter element 17, the straw and stalks are clipped off by the scissor-like cutting action provided by their co-operation. Some of the straw and stalks, of course, will slide outwardly toward the outer end of the rotary knife 19. To increase the cutting efficiency of the knife 19 we have provided a hook-shaped cutting edge 24 on each end of the knife 19 which provides a scythe-like cutting action against the straw and stalks as it rotates, and prevents the stalks and straw from slipping outwardly beyond the end of the knife 19 as it meets and passes the fixed cutting element 17. It has been found that this structure greatly increases the efficiency of the knife and enables us to reduce the number of knives and their co-operating cutting elements to a single set. After the straw and stalks have been finely disintegrated by the rotary cutting knife 19 and its co-operating cutting element 17 they are drawn inwardly into the rotor housing by the rapidly rotating rotor 30. The frusto-conical drum 31 precludes winding of the straw and stalks about the shaft 11 after it has passed through the cutting elements. As the straw and stalks are engaged by the rotor they are centrifugally flung outwardly through the discharge 32 against the scattering device S. As the stalks are straw strike the scattering device S they are divided at the point 35 by the two flanges 34, approximately one-half of the material going to the one side and the remaining one-half to the other. Some of the material on each side follows along the downwardly curved plate 33 and is thrown rearwardly and substantially horizontally. The remainder of the straw and stalks is caught by the downwardly curved corners 36 and is directed considerably more to the sides and downwardly. It has been found that this device provides a uniform distribution of the straw and stalks over the ground to the rear and sides of the combine. This device serves to overcome a difficulty which has confronted combine operators for a long time. It is highly desirable that the straw and stalks emanating from the discharge of a combine be finely disintegrated and then uniformly distributed over the soil to provide fertilizer and a mulch for the same. In the past, combines and other harvesters have left the straw and stalks on the field in large clumps or in windrows so that it was necessary to burn the straw and stalks to preclude their interference with the subsequent plowing operations of the farmer. Our disintegrator and scatterer together with the scattering device S obviates the need for such a practise and at the same time saves the valuable straw material which is needed to keep the soil porous and fertile.

It should be noted that the rotor 30 creates a suction of considerable proportion when it is rapidly rotated. This suction aids in drawing the straw and stalks laterally behind the combine and into the knife 19 and the fixed cutting element 17. It also draws the disintegrated straw and stalks from the cutting elements into the rotor 30, which engages the material and flings it outwardly through its discharge opening 32.

It will, of course, be understood that various changes may be made in the form, details, arrangement and proportions of the various parts without departing from the scope of our invention.

We claim:

1. A straw and stalk disintegrator and scatterer for a combine or other harvester, having in combination a housing having means for mounting the same upon a harvester in a position transversely thereof and at the lower portion of the discharge thereof and having a stalk receiving opening at the upper portion thereof for receiving stalks and straw from the harvester, a single rotatable shaft mounted transversely of said housing and adapted to be connected to a source of rotary power, a rotary conveyor mounted in said housing and extending substantially the full width of the harvester discharge for receiving stalks and straw and delivering the same to one end of said housing, a rotary cutter knife at said end of said housing, and a co-operating cutter element mounted for close working clearance to said rotary knife, and a blower mounted outwardly of said housing and said cutter elements and having its intake communicating with said housing to draw material transversely of said harvester discharge, said blower having a discharge located exteriorly of said housing and said harvester, said blower and said conveyor and said rotary cutter knife being each mounted on said shaft for rotation thereby.

2. A stalk and straw disintegrator and scatterer for a combine or other harvester having in combination a housing having means for mounting the same upon a harvester in a position transversely thereof and at the lower portion of the discharge thereof and having a stalk receiving opening at the upper portion thereof for receiving stalks and straw from the harvester, a rotatable drum extending substantially the full width of the harvester discharge, structure for rotatably mounting said drum in position to receive at its top portion stalks and straw normally directed rearwardly and downwardly by the inherent structure of the harvester, a spiral flange secured to and extending outwardly from said drum in spiral pattern at a pitch sufficient to surround at least one-half of the length of said drum per convolution whereby convolutions of said flange are spaced sufficiently far apart to receive therebetween in direct contact with said drum the stalks and straw from the stalk discharge passage of the harvester, a rotary cutting knife, structure for rotatably mounting said knife in position to receive stalks and straw fed laterally into same by said rotatable drum and said spiral flange, a co-operating cutting element mounted for close working clearance to said rotary knife, and a blower mounted outwardly of said housing and said cutter elements and having its intake communicating with said housing to draw material transversely of said harvester discharge, said blower having a discharge located exteriorly of said housing and said harvester.

3. A straw and stalk disintegrator and scatterer for a combine or other harvester comprising a rotatable drum, a spiral flange secured to and extending outwardly from said drum to form a screw type conveyor, structure for rotatably mounting said drum in position to receive stalks and straw normally directed rearwardly and downwardly by the inherent structure of the harvester, a rotary cutter element diametrically disposed relative to said drum and at one end of said drum, structure for rotatably mounting said cutter element in position to receive stalks and straw fed laterally into same by said flanges, a second and cooperating cutter element, and mechanism for connecting said rotary cutter element and said drum with a rotary source of power for driving the same at high speed, said rotary cutter element and said drum being mounted on a single rotatable shaft whereby a saving in power required may be effected.

4. A stalk and straw scatterer for a combine or other harvester for use in conjunction with a straw disintegrator and its housing having in combination a rotor housing adapted to be mounted outwardly relative to such disintegrator and in longitudinal alignment with and adjacent the outlet end of the disintegrator housing and having a discharge opening disposed in its upper portion and directed toward the rear of the combine, a rotor mounted in said housing for revolution on a horizontal axis, mechanism for connecting said rotor with a source of rotary power for driving said rotor at high speed and a stalk and straw scattering member carried by the top portion of said rotor housing adjacent said discharge opening and extending backwardly therefrom, said member comprising a slightly downwardly curved plate and two substantially obtuse triangular shaped flanges meeting at the forward central portion of said plate to form a divider for the discharge of said rotor and extending downwardly and rearwardly from said plate and having their rear end portions curve outwardly away from each other and downwardly away from said plate whereby some of the stalks and straw emanating from the discharge opening may be directed downwardly to each side and behind said housing, and some of the stalks and straw emanating from said discharge opening may be directed horizontally to each side of said rotor housing to fall upon the ground at considerable distance from the combine.

References Cited in the file of this patent

UNITED STATES PATENTS

| Number | Name | Date |
|---|---|---|
| 54,351 | Hoit | May 1, 1866 |
| 891,299 | Smith | June 23, 1908 |
| 1,524,387 | Ronning | Feb. 3, 1925 |
| 1,558,613 | Holland-Letz et al. | Oct. 27, 1925 |
| 1,769,715 | Schaefer | July 1, 1930 |
| 2,239,486 | Edwards | Apr. 22, 1941 |
| 2,280,677 | Wagner et al. | Apr. 21, 1942 |
| 2,327,893 | Hobson | Aug. 24, 1943 |
| 2,496,493 | Raney | Feb. 7, 1950 |
| 2,554,669 | Elofson | May 29, 1951 |

FOREIGN PATENTS

| Number | Country | Date |
|---|---|---|
| 29,900 | Netherlands | Dec. 16, 1929 |